3,133,592
APPARATUS FOR THE APPLICATION OF ELECTRICAL ENERGY TO SUBSURFACE FORMATIONS

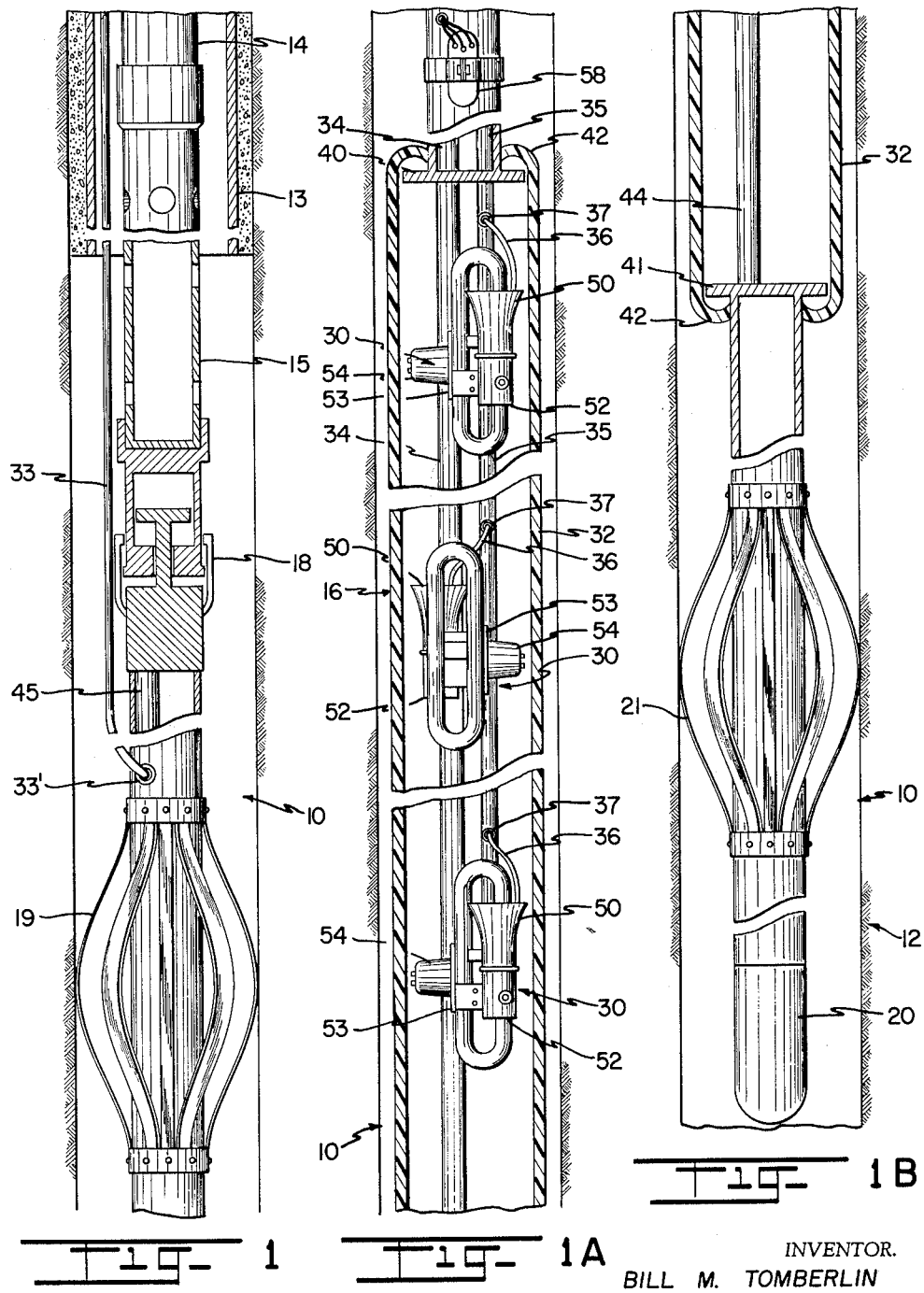

Bill M. Tomberlin, Denver, Colo., assignor to Petro-Electronics Corporation, Denver, Colo., a corporation of Delaware
Filed May 25, 1959, Ser. No. 815,415
8 Claims. (Cl. 166—60)

This invention relates to a novel apparatus adapted for the application of electrical energy to organic substances, and more particularly relates to the application of microwave energy to subsurface, petroleum reservoirs in such a way as to permit increased release of oil and gas therefrom.

Various methods and devices are customarily employed in the primary and secondary recovery of oil and gas from subsurface formations in an effort to realize an increase in production therefrom. In order to increase recovery, it is often necessary to remove or at least reduce retarding influences on the normal migration of oil and gas into the well bore, or to artificially increase the drive mechanism present in the formation to thereby permit increased migration of oil and gas toward the well bore. The normal tendency of oil and gas to migrate into the well bore may be slowed or retarded for several reasons, among which are that certain crude oils have high viscosities which tend to exert a drag effect on their flow through the formation, or paraffin and similar materials may accumulate in the reservoir near the well bore; also, the surface tension or, more specifically, the boundary layer adhesion of the fluid may exert a frictional drag between the oil and the reservoir stratum. Efforts to obviate the above influences in order to realize increased production of oil and gas have in the main consisted of the down-hole application of energy to the formation, usually in the form of heat, which would have the effect of reducing the viscosity of the crude oil in the vicinity of the well bore and thus enable its release from the formation for removal to the surface. In general, in all such applications reliance has been placed upon the conduction of the energy by the oil into the reservoir stratum. This is disadvantageous in that the oil which acts as a conducting medium is continually being transferred into the well bore for removal so that the heat energy is continually being depleted and accordingly the depth of heat penetration of the heat into the reservoir is severely limited. This is particularly true with respect to the use of conventional down-hole heating equipment where the heat energy is conducted by means of the oil and gas in the reservoir, since the heavier crudes, which generally require heating the most, are the poorest type of thermal conductors among the crude oils, and also many of the reservoir rocks in the formation such as limestone and dolomite are poor conductors of heat.

In accordance with the present invention, an apparatus for increasing the capacity of oil and gas recovery from a subsurface formation is proposed wherein it is not necessary to rely on the oil as a heat conducting medium and is effective to accomplish the instantaneous transfer of heat to greatly increased depths of penetration of the formation. In addition, the means of the present invention is capable of substantially reducing the viscosity of the crude oil throughout the depth of penetration of the energy medium to produce a gas drive mechanism, and to melt paraffin and other high viscosity materials at an artificially lower temperature thereby to enable more effective migration of oil and gas from the well bore.

Accordingly, it is a primary object of the present invention to provide for the instantaneous, non-conductive transfer of energy into a fluid-bearing formation for attenuation into the form of heat thereby to facilitate release of the fluids therefrom.

It is another object to provide for a way of attaining greatly increased depths of heat penetration into a subsurface, fluid bearing formation thereby to facilitate the movement of the fluid towards a well bore for removal therefrom.

It is a further object to provide for a novel apparatus for the application of high frequency electrical energy into a subsurface oil and gas-producing formation, and in such a way as to greatly enhance the oil and gas producing capacity of the formation.

It is a still further object to provide for a novel apparatus whereby microwave energy may be directed from a well bore into a subsurface oil or gas-producing formation to produce an instantaneous, non-conductive transfer of heat through considerable distances in the formation to effectively reduce the viscosity of the crude oil in the formation, to produce gas through de-polymerization of the crude oil, and to melt extremely high viscosity materials, such as paraffin, at artificially lower temperatures, while at the same time eliminating the necessity of complicated, heavy duty equipment.

Although the apparatus of the present invention is conformable for use in the treatment of various organic substances, it has particular adaptation in conjunction with the inducement of flow or migration of oil or gas toward a well bore from a subsurface, fluid bearing formation, and in this connection may be employed either in open-holes or cased holes, especially in view of the manner in which it is insulated from direct contact with the formation and fluids. Essentially, the present invention is based on the discovery that high frequency electrical energy, preferably microwave energy, is capable of being directed into the formation at considerable distances from the well bore due to the relatively low dielectric loss factor of the petroleum fluids in the formation and which will thus act to pass or transmit the wave lengths of electrical energy, rather than to reflect or attenuate them. At the same time, the reservoir stratum possesses in general a high dielectric loss factor and will thus operate to attenuate the wave lengths into heat energy and will of course heat the surrounding oil and gas in the formation. Generally, the dielectric loss factor will determine the degree of attenuation of the wave length and since the dielectric loss of the crude oil is on the order of eight times less than that of the saturated wall of rock, the oil in the well bore operates to pass the electrical energy into the reservoir stratum with very little attenuation, whereas the reservoir stratum will act primarily to attenuate the microwave energy into heat. Accordingly, the pattern of heat transference with the use of high frequency electrical energy is not one of heat conduction from the source to the oil, and then to the reservoir stratum, but conversely will be from the source to the reservoir stratum, thence to the oil and gas itself. The advantages of this are striking in that the well may be pumped at any rate without impairing the transfer of energy into the reservoir stratum, and the rate of heat transfer is practically instantaneous along a line extending through the fluid, rather than being conductive and dependent upon the conduction of heat between fluid molecules. In addition, the transfer of high frequency electrical energy through the oil in the formation is not in any way impaired by the gravity or thermoconductivity of the oil itself and it has been found that generally two crude oils, one possessing a high thermal conductivity and one possessing a low thermal conductivity will have essentially equal microwave energy conductivity. Furthermore the gravity of the oil will have little or no effect on the rate or extent of microwave energy transfer through the formation.

The favorable effects of heating the crude oil by the application of high frequency electrical energy, preferably in the microwave region, is further supplemented by the generation of gas, which is derived from de-polymerization of the oil, and the gas will serve as an additional drive factor to encourage the oil to migrate toward the well bore. Moreover, it has been found that the microwave energy applied to the formation has a tendency to lower the surface tension of the oil by what is suspected to be a scrubbing action initiated in the crude oil. Furthermore, microwave energy application breaks down the paraffin and similar accumulations even at great distances from the well bore in the reservoir stratum which otherwise severely retards the normal migration of the oil through the formation. In this connection, it is emphasized that heat is not the sole factor in the energy transfer by microwave energy since it has been found that the paraffin actually goes into a fluid phase at a lower temperature than that which would normally be expected. Other particles, such as ice crystals which form in the reservoir stratum and which are due to a release of pressure and lowering of temperatures are also reduced to a liquid phase on account of the increased pressures brought about by creation of gas in the formation, along with the heat generated by the microwave energy. These ice crystals most commonly form in gas wells where dehydrated ice crystals are created from water vapors within the natural gas itself, and the application of microwave energy will achieve an exceptional depth of penetration in a gas formation since the gas also has a low dielectric loss factor and will easily pass the wave lengths therethrough, whereas its ability to act as a conductor of heat is very low.

The present invention provides apparatus in which the high frequency energy is radiated through a shield comprised of dielectric low loss material whereby sufficient power may be radiated into the subsurface formation to produce the desired heating while assisting in impedance matching the radiated energy into the fluid around the shield in the well and thence into the subsurface formation thereby insuring that the high frequency radiated energy intensity in the fluid, and at the bore face of the subsurface formation is below levels where formation coking or other damage might occur.

The present invention further provides for the generation of the high frequency energy in a region adjacent the subsurface formation whereby losses in transfer of high frequency energy from the generator to the subsurface formation are minimized and the optimum frequency, which for many petroleum formations is preferably in the microwave range, may be used for optimum treatment of the particular subsurface formation. The term "microwave energy" as used throughout the specification and claims means radiated electromagnetic wave energy having a wave length in the medium to be treated or heated by microwave energy of less than substantially 100 centimeters.

The above and other objects and advantages of the present invention will therefore become more apparent from the following detailed description taken together with the accompanying drawings, in which:

FIGURE 1 is a fragmentary, elevational view partially in section of a preferred form of apparatus, in accordance with the present invention.

FIGURE 1a is a continuation of FIGURE 1 showing the intermediate section of the preferred form; and FIGURE 1b is a continuation of FIGURE 1a showing the lower end portion of the preferred form of apparatus in accordance with the present invention.

Referring more particularly to the drawings, there is shown by way of illustrative example in the figures a well bore 10 for removal of oil and/or gas from a subsurface formation indicated generally at 12 into which there is lowered and positioned a casing number 13 terminating above the producing formation with a producing string 14 extending downwardly therethrough in spaced, inner concentric relation. To the lower end of the production tubing 14 there is secured a suitable collar such as a perforated tubular body 15 which serves as a connecting means for suspension of a high frequency electrical energy generating unit 16 at the lower end of the production string in opposed relation to the producing formation.

In order to insulate the generating unit 16 from any jarring or impact with either the sides of the well bore in traveling downwardly therethrough or with the bottom thereof when it is landed, the tubular body 15 may include suitable shock absorbing means such as a fluid filled coupling 18 together with a centralizer 19. In addition, a bull plug 20 is provided on the lower end of the generating unit 16 and the plug 20 also includes a centralizer 21 although it is evident that other devices may be employed in the disposition and mounting of the unit 16.

Various means may be employed for generating electrical energy, and it is greatly preferred to generate microwave energy through the use of various commercially available units, such as a klystron, magnetron or amplitron; and, in the preferred form of the present invention, the generating unit 16 is defined by a magnetron assembly wherein pulsed, high voltage direct current is supplied from a suitable power source, not shown, through a power tube mounted down-hole in the well bore for conversion into high frequency energy. Preferably, a series of magnetrons 30 are mounted in vertical spaced relation within a shield 32 and with electrical energy in the form of high voltage direct current being supplied or transmitted to the magnetrons by means of a flexible cable 33 extending downwardly through the annular space between the production tubing 14 and casing 13 from the power source. A pair of tubular members defined by a cooling tube 34 and conduit 35 extend downwardly in spaced relation through the shell, and the cooling tube 34 may be composed of a copper tubing material containing a suitable coolant such as ethylene glycol to cool the magnetrons in operation. The conduit 35 in turn serves as a casing or covering through which the flexible cable 33 may be inserted, the flexible cable extending inwardly through opening 33' in the lower end of the tubular body 15 and then downwardly through the conduit. A series of auxiliary lines 36 are led through outlets 37 in the conduit from the flexible cable 33 for connection into each of the respective magnetrons. As shown, three magnetrons are disposed in spaced relation along the tubular members 34 and 35, although the number of magnetrons to be employed may vary in accordance with the depth of the formation and power requirements and may consist of any suitable number to carry out the intent and objectives of the present invention.

The shield 32 serves to protect and insulate the magnetron assembly from direct contact with the fluids and particles in the well bore while permitting the free passage of microwave energy therethrough into the formation, and to this end is preferably composed of a transparent fiberglass shell which is connected in sealed relation to the lower end of the perforated tubular body 15 and the upper end of the bull plug 20, respectively. Connection of the shell may be accomplished in any desired manner and a suitable form of connection is shown wherein the tubular body and bull plug are respectively provided with enlarged outwardly projecting horizontal plates 40 and 41 and the respective ends of the shell are curved inwardly to form restricted openings 42 so as to embrace the ends of the joint and bull plug adjacent to and just beyond the plates 40 and 41. The restricted openings 42 of the shell may be sealed in place to the joint and bull plug by suitable adhesives or weld in order to establish a rigid sealtight connection. The cooling tube 34 also acts to support the elements comprising the assembly in rigid relation by connecting the lower end of the tubing 34, as at 44, into the top surface of the plate 41 with the tubing extending upwardly through the plate 40 for connection to the lower end of the coupling 18, as at 45. The male end of the coupling may in turn be provided with a vertical bore or spout for introducing the ethylene glycol through the body of the male end into the cooling tube 34, after which the bore may merely be plugged up, not shown, or the tubing 34 may merely be filled with the ethylene glycol prior to interconnection with the plate 41 and coupling 18.

In the structure shown, cooling of the magnetron units 30 occurs by conduction of the heat from the magnetrons through the mounting connections into cooling tube 34 where it is distributed relatively uniformly along the tube by convection currents in the fluid within the tube. The heat is then radiated from the tube 34 through the shield into the subsurface formation 12 thereby assisting the heating of the formation. If desired, a fluid-containing jacket may surround the magnetron as shown in U.S. Patent 2,497,436 issued February 14, 1950 to W. C. Brown and in this event the input and output pipes supplying fluid to the jacket would be connected to vertically spaced points on the cooling tube 34 and fluid would then circulate by convection up through the magnetron jacket and down along the tube 34 thereby aiding in transferring heat from the magnetron anode to tube 34. Additional cooling may be provided in a well-known manner by pumping fluid through the magnetron jacket and through additional tubes like 34 or other heat exchangers to further aid in cooling the magnetrons.

Many suitable types of magnetrons are available for use in the generation of microwave energy in accordance with the present invention, and representative of such is the Raytheon QK 390 magnetron tube, or the unit shown and described in Patent No. 2,497,436 by W. C. Brown. Units of this type are capable of delivering a wave length on the order of 12 centimeters in response to the application of minus 4800 volts pulsating D.C. from a 115 volt A.C. power source; and, as illustrated in the drawing, each magnetron unit 30 is broadly comprised of a feeder induct 50, a magnet 52, a mounting flange 53 together with a power tube 54 including a dome and microwave antenna, not shown, for radiating microwave energy and directing it into the formation. A suitable clamp, not shown, may be employed for connecting the mounting flanges 53 and each of the units through either the cooling tube 34 or conduit 35 so as to hold the unit securely in place against any accidental shifting or movement.

In carrying out a typical treating operation in a production formation, the entire assembly may be positioned at the lower end of the production tubing and lowered into the well bore until the bull plug is landed at the bottom thereof or until the magnetron assembly is in position opposite to the producing formation. All recording equipment and power supplies are of course located at the well head or in a suitable trailer unit with the exception of a thermocouple 58 which as shown may be disposed just above the shell 30 to record electronically the oil temperatures of the crude oil released from the formation. Once positioned in desired relation in the well bore, the power source may be energized so as to energize the magnetron assemblies which are connected in parallel, for the application of microwave energy to the formation. In this connection, it is desirable to face the power tubes and associated antennaes in different directions so as to disseminate the wave lengths equally throughout the formation.

In general, by selective variation of the frequency and wavelength, the amount of energy for attenuation into heat together with the depth of penetration thereof may be regulated. It has been found that the depth of penetration of the wave lengths increases with a decrease in length of the wave length while the energy available for dissipation into heat will decrease, so that a balance should be made to direct the desired amount of microwave energy into the formation with a wavelength which will provide for optimum penetration and heat dissipation. Moreover, the optimum frequency and wave length setting is affected by the permittivity and conductivity of the material in the formation, and must be considered in a determination of the optimum balance between heat and lateral penetration of the microwaves for optimum production, and of course the frequency setting may be varied as the heating operation proceeds.

The following is given for the purpose of illustration and not limitation, to indicate the energy and depth of penetration value attainable in accordance with the present invention. Based on a 1000 watt power output and with the frequency set to produce a wavelength of 12 centimeters, the energy will of course gradually become dissipated in traveling through the formation. Nevertheless, due to the low dielectric loss factor of the oil, it has been found possible to retain in excess of 500 watts of the power output at distances of 90 to 100 centimeters from the formation face. Moreover, at a distance on the order of 150 centimeters from the formation face 250 watts would be available, and these energy values of course represent that which would be present for attenuation into the form of heat energy by the formation stratum. Under a decrease in frequency with a corresponding increase in wavelength the depth of penetration may be expected to decrease but with a high rate of heat dissipation over a more concentrated area. As mentioned, these values may be expected to vary somewhat depending upon the characteristics of the formation.

In operation, the magnetron assembly may be suspended either above or below the fluid level of the bore hole and important factors to be considered in determining the most efficient positioning of the magnetrons with respect to the fluid level have been found to be, among others, the operating temperature tolerance of the anodes of the magnetrons together with the efficiency of the power tubes. As shown in the drawing, the magnetrons are suspended beneath the fluid level in the well bore and as the magnetrons produce microwaves at the proper frequency oil will be expelled into the bore hole such that the oil column rises and finally reaches hte level of the perforated tubular body. At this point the oil may be lifted to the surface by conventional pumping equipment, not shown.

From the foregoing, it will be evident that the present invention involves essentially the generation of high frequency electrical energy, preferably microwave energy, combined with the simultaneous application of this energy at predetermined wavelengths to provide for optimum heat and depth of penetration of the formation. More specifically, the present invention comprises the vertical spacing of a series of magnetrons or similar units for application of the energy in a number of selected directions to assure uniform application throughout the formation.

Summarizing the above, it will thus be apparent that high frequency electrical energy is useful to an unexpected degree to expel crude oil from formations by supplementing the natural drive present, by reducing the viscosity of the oil which would normally and otherwise be retained in the formation, and by removing impediments to normal migration of the oil. In addition, it may be used to assist in the production of high paraffin crudes by providing the deepest heat energy penetration into the formation, to add additional gas to dissolved gas drive reservoirs in which the necessary gas for crude oil production has been depleted, or to create high gas pressures in a field by allowing a selected well to shut in and thereafter applying electrical energy in the well to build up gas pressure. Again, it is emphasized that energy applied in the microwave region is most effective since the transfer is instantaneous throughout the formation to greatly increased depths of penetration notwithstanding the rate of flow of the fluid and the characteristics of the formation itself, although it is believed that lower frequencies would also be useful in lower production, sustained drive operations.

It is therefore to be understood that various changes and modifications may be made in the construction and arrangement of the apparatus employed in the present inventoin without departing from the scope thereof, as defined by the appended claims.

What is claimed is:

1. An apparatus for treating a subsurface petroleum reservoir for the release of fluids therefrom wherein production tubing is suspended in a well bore, the combination of a series of vertically spaced microwave energy generating units, means for suspending said units at the lower end of the production tubing opposite the subsurface formation, means for generating and directing microwave energy into the formation, a power source to energize said units, and an outer shield enclosing said units being composed of a low dielectric loss material to insulate said units from the formation.

2. An apparatus according to claim 1 wherein said units are mounted for dissemination of the microwave energy at spaced angular and vertical directions into the reservoir.

3. An apparatus for heating a subsurface oil-bearing formation for the release of oil therefrom wherein a production tubing is suspended in a well bore, the combination therewith of a power source, a series of magnetrons, means suspending said magnetrons in the well bore opposite the subsurface formation, said magnetrons being responsive to energization of said power source for directing microwave energy into the formation, and a shield composed of a low dielectric loss material enclosing said magnetrons.

4. An assembly adapted for suspension at the lower end of the production tubing in a well for the generation of microwave energy, comprising a shell composed of a low dielectric loss material, a power source, generating means spaced within said shell responsive to energization of said power source to generate microwave energy of a predetermined wave length, and means on said generating means to direct the microwave energy into the subsurface formation to thereby promote the release of fluid therefrom.

5. An assembly adapted for suspension at the lower end of the production tubing in a well for the generation of microwave energy comprising a shell composed of a low dielectric loss material, a power source, a series of magnetrons within said shell responsive to energization of said power source to generate microwave energy of a predetermined wave length, and means extending from the surface through the well bore for supporting said magnetrons in vertically spaced relation opposite the producing formation to direct the microwave energy generated into the producing formation to thereby promote the release of fluid therefrom.

6. An apparatus for treating a subsurface petroleum reservoir for the release of oil and gas therefrom into a well bore, the combination of a microwave generator, means extending through the well bore for suspending said generator opposite the subsurface petroleum reservoir, said generator having means for directing microwave energy laterally through the reservoir, a power source to energize said microwave generator, and a shield mounted in outer concentric relation to said generator so as to enclose said generator, and said shield being composed of a low dielectric loss material.

7. An assembly adapted for suspension in a well for the generation of microwave energy including a shell comprised of dielectric low loss material, a power source, generating means spaced within said shell responsive to energization of said power source to generate microwave energy, and means to direct the microwave energy into the subsurface formation to thereby promote the products of fluid therefrom.

8. In combination, a subsurface petroleum formation and a tool supported adjacent the formation, said tool including a shell comprised of dielectric low loss material, generating means supported within said shell responsive to energization of a power source for generating microwave energy, and means supported with respect to said generating means for radiating the energy into the subsurface formation.

References Cited in the file of this patent

UNITED STATES PATENTS

| | | |
|---|---|---|
| 2,133,776 | Bender | Oct. 18, 1938 |
| 2,220,509 | Brons | Nov. 5, 1940 |
| 2,455,942 | Coggeshall et al. | Dec. 14, 1948 |
| 2,521,442 | Birdseye | Sept. 5, 1950 |
| 2,585,970 | Shaw | Feb. 19, 1952 |
| 2,599,033 | Wild | June 3, 1952 |
| 2,632,868 | Hull | Mar. 24, 1953 |
| 2,700,422 | Bodine | Jan. 25, 1955 |
| 2,748,868 | Carpenter | June 5, 1956 |
| 2,757,738 | Ritchey | Aug. 7, 1956 |